United States Patent [19]

Cowley et al.

[11] 4,086,329

[45] Apr. 25, 1978

[54] INTEGRATED CHLORINE DIOXIDE PRODUCING SYSTEM

[75] Inventors: Gerald Cowley, Mississauga; Richard Swindells, Caledon; Mark Kostanecki, Toronto, all of Canada

[73] Assignee: Erco Industries Limited, Islington, Canada

[21] Appl. No.: 787,320

[22] Filed: Apr. 14, 1977

Related U.S. Application Data

[63] Continuation-in-part of Ser. No. 634,137, Nov. 21, 1975, abandoned.

[30] Foreign Application Priority Data

Dec. 13, 1974 United Kingdom .............. 53899/74

[51] Int. Cl.$^2$ .................... C01B 11/02; C01B 7/04; C01D 5/00
[52] U.S. Cl. .................... 423/478; 423/481; 423/500; 423/552
[58] Field of Search ............. 423/478, 552, 480, 481, 423/500, 487

[56] References Cited

U.S. PATENT DOCUMENTS

| | | | |
|---|---|---|---|
| 2,280,938 | 8/1942 | Vincent ...................... | 423/478 UX |
| 2,585,593 | 2/1952 | Sevon ......................... | 423/480 |
| 3,789,108 | 1/1974 | Rapson ....................... | 423/478 |
| 3,793,439 | 2/1974 | Rapson ....................... | 423/478 |
| 3,829,557 | 8/1974 | Winfield ..................... | 423/478 |
| 3,864,456 | 2/1975 | Winfield et al. ............ | 423/478 |
| 3,864,457 | 2/1975 | Hoekje et al. .............. | 423/480 |
| 3,895,100 | 7/1975 | Cowley ....................... | 423/478 |

*Primary Examiner*—Edward Stern
*Attorney, Agent, or Firm*—Sim & McBurney

[57] ABSTRACT

Chlorine dioxide and chlorine are produced by reduction of sodium chlorate with chloride ions in an aqueous acid medium having a total acid normality of 2 to 4.8 normal. The reaction medium is maintained at its boiling point under a subatmospheric pressure to provide steam dilution of the chlorine dioxide and chlorine and anhydrous neutral sodium sulphate is deposited therefrom. Chlorine dioxide is recovered as an aqueous solution containing some dissolved chlorine while the bulk of the chlorine is recovered in gaseous form. Part of the recovered chlorine is reacted with sulphur dioxide and water, preferably in heat exchange relationship with the reaction medium to impart heat of reaction thereto, to form hydrochloric acid and sulphuric acid for feed to the reaction medium in sufficient quantity to provide no more than the quantity of sulphate ions required at the prevailing efficiency of the chlorine dioxide-producing reaction to form neutral sodium sulphate from sodium ions introduced to the reaction medium with the sodium chlorate. The remainder of the hydrogen ion and chloride ion feed requirements of the reaction medium are provided either by hydrogen chloride or hydrochloric acid, preferably formed by reaction of chlorine, including recovered chlorine, and hydrogen, or by a mixture of 2 moles of sodium chloride and one mole of sulphuric acid.

11 Claims, 2 Drawing Figures

INTEGRATED CHLORINE DIOXIDE PRODUCING SYSTEM

CROSS-REFERENCE TO RELATED APPLICATION

This application is a continuation-in-part of application Ser. No. 634,137 filed November 21, 1975, now abandoned.

FIELD OF INVENTION

The present invention is directed to the production of chlorine dioxide.

BACKGROUND TO THE INVENTION

Chlorine dioxide is a valuable chemical, typically used in aqueous solution form in the bleaching of cellulosic fibrous material pulps, and is known to be formed in a number of ways, generally involving the reduction of a chlorate by chloride in an acid medium.

The basic reaction involved in such processes is summarized by the equation:

$$ClO_3^- + Cl^- + 2H^+ \rightarrow ClO_2 + \tfrac{1}{2} Cl_2 + H_2O \tag{1}$$

Commonly, the chlorate ions are provided by sodium chlorate, the chloride ions by sodium chloride and/or hydrogen chloride and the hydrogen ions by sulphuric acid and/or hydrochloric acid. Along with the reaction depicted by equation (1), there is a competing reaction which decreases the efficiency of the conversion of chlorate ions to chlorine dioxide, represented by the following equation 2:

$$ClO_3^- + 6H^+ + 5Cl^- \rightarrow 3Cl_2 + 3H_2O \tag{2}$$

In one known manner of producing chlorine dioxide, as set forth in more detail in Canadian Pat. No. 826,577, the aqueous reaction medium containing sodium chlorate, sodium chloride and/or hydrogen chloride and sulphuric acid at an acidity of about 2 to 4.8N, is maintained at its boiling point while the reaction vessel is maintained under a subatmospheric pressure, resulting in evaporation of water from the reaction medium, removal of the chlorine dioxide and chlorine in gaseous admixture with the steam and deposition of solid by-products, mainly anhydrous sodium sulphate, in the reaction vessel. The reaction is carried out at an elevated temperature below that above which substantial decomposition of chlorine dioxide would occur. The gaseous mixture of chlorine dioxide, chlorine and steam then is processed to condense the steam and recover an aqueous solution of chlorine dioxide, which usually contains some dissolved chlorine.

The sodium sulphate deposited as by-product is removed from the reaction vessel, continuously or intermittently, and is utilized as make-up chemical in the recovery cycle of a pulp mill of any convenient type, typically a Kraft pulp mill.

In a Kraft pulp mill operation, wood chips or other raw cellulosic fibrous material are digested with a white liquor containing sodium sulphide and sodium hydroxide as the active pulping hemicals to form a wood pulp which is separated from spent pulping liquor, otherwise known as black liquor.

The pulp thereafter usually is subjected to bleaching and purification operations in a bleach plant to form a pulp of desired brightness, the bleaching steps typically utilizing the chlorine dioxide solution produced in the chlorine dioxide-producing system.

The black liquor is subjected to recovery and regeneration operations to form fresh white liquor for recycle to the digestion stage to provide at least part of the white liquor used therein. The recovery and regeneration operations generally involve an initial concentration of the black liquor followed by burning in a furnace to form a smelt containing sodium sulphide and sodium carbonate. The smelt is dissolved in water to form an aqueous solution thereof, known as green liquor, which, after clarification to remove undissolved solids, is causticized with slaked lime resulting in the conversion of carbonate to hydroxide, with consequent deposition of calcium carbonate. The calcium carbonate is recovered and usually is used to form further slaked lime. The aqueous solution resulting from separation of the calcium carbonate therefrom is the recycled white liquor.

The sodium sulphate recovered from the chlorine dioxide generator is used as a source of make-up chemicals for this system, to make up losses of soda and sulphur values. The quantity of make-up chemical required varies from mill to mill, although in most cases it is less than the chlorine dioxide requirement, due to tightening up of the mill recovery system, with less losses thus being experienced The above-mentioned chlorine dioxide-producing procedure provides about 1 mole of sodium sulphate and ½ to 1 mole of chlorine for each mole of chlorine dioxide formed. With the decrease in losses of sodium and sulphur values, the prior art process typically produces more sodium sulphate than can be used by the mill and hence the excess accumulates.

Further, with the tendency to use less quantities of chlorine in bleaching, excess quantities of chlorine gas may be produced.

SUMMARY OF INVENTION

In accordance with the present invention, chlorine, including at least part of the by-product chlorine from the chlorine dioxide producing reaction, is reacted in a known exothermic reaction with sulphur dioxide, in accordance with with the equation:

$$SO_2 + Cl_2 + 2H_2O \rightarrow H_2SO_4 + 2HCl \tag{3}$$

The mixture of sulphuric acid and hydrochloric acid is fed to the chlorine dioxide generator, the hydrogen ions and chloride ions contained in the mixture utilized to provide hydrogen ions, chloride ions and sulphate ions to the chlorine dioxide-producing reaction.

Due to the inefficiencies introduced to the chlorine dioxide-producing process by the competing reaction according to equation (2), imbalances result from feed of the products of equation (3) as the sole source of the hydrogen, chloride and sulphate ion requirements, and these must be compensated for if a stable steady state chlorine dioxide-forming procedure is to be maintained. The present invention achieves such compensation while at the same time allowing variation in the quantity of sodium sulphate produced per mole of chlorine dioxide.

GENERAL DESCRIPTION OF INVENTION

The extent to which equation (1) predominates over equation (2) in the reduction of chlorate ions represents the efficiency of chlorine dioxide production, which may be designated E. E is expressed in a decimal less than 1.00, corresponding to the % conversion of chlorate to chlorine dioxide by equation (1), the value 1.00 representing 100% conversion or efficiency, 0.90 representing 90% conversion or efficiency, and so on. The efficiency E may be controlled by controlling the chloride to chlorate mole ratio in the generator or by the use of chlorine dioxide formation-promoting catalysts.

Thus, it is well known that the lower the chloride to chlorate mole ratio in the generator, the more efficient is the chlorine dioxide-producing process, up to the inherent limits of efficiency of the particular system.

Several chlorine dioxide formation-promoting catalysts are known which increase the efficiency of production of the chlorine dioxide. Typical of the catalysts is silver ions.

The hydrogen ion requirement for a chlorine dioxide-producing system to produce 1 mole of chlorine dioxide depends on the overall efficiency ($E$), and from equations (1) and (2), is represented as follows:

$H^+$ requirement = $(6-4E/E)$ moles $H^+$/mole $ClO_2$ formed. Similarly, the chloride ion requirement per mole of chlorine dioxide formed is represented as follows:

$Cl^-$ requirement = $(5-4E/E)$ moles $Cl^-$/mole $ClO_2$ formed. Further, the quantity of chlorine produced from the reaction medium is represented as follows:

$Cl_2$ produced = $(6-5E/2E)$ moles $Cl_2$/mole $ClO_2$.

The chlorate feed requirement is $(1/E)$ moles/mole $ClO_2$ produced and hence the mole ratio of $Cl^-$:$ClO_3^-$ in the feed is $5-4E$:1. Hence, for all efficiencies less than 1, the mole ratio of $Cl^-$:$ClO_3^-$ is always greater than 1:1. It is preferred to operate as close as possible to a 1:1 mole ratio in the feed.

There are thus a number of constraints on the chlorine dioxide-generating system which must be carefully observed if a steady state continuous production of chlorine dioxide is to be maintained at any given efficiency. It would normally be preferred, of course, to operate the system at the highest possible efficiency to obtain as high a conversion as possible of chlorate to chlorine dioxide by the reaction of equation (1). Nevertheless, the constraints apply irrespective of the efficiency ($E$), and are as follows per mole of chlorine dioxide formed:

$$H^+ \text{ feed} = \frac{6-4E}{E} \text{ moles}$$

$$Cl^- \text{ feed} = \frac{5-4E}{E} \text{ moles}$$

$$ClO_3^- \text{ feed} = \frac{1}{E} \text{ moles}$$

$$H^+:Cl^- \text{ mole ratio} = \frac{6-4E}{5-4E} : 1$$

$Cl^-$:$ClO_3^-$ mole ratio in the feed = $5-4E$ : 1

Feeds in these quantities produce 1 mole $ClO_2$ and $(6-5E/2E)$ moles $Cl_2$.

The reaction of chlorine and sulphur dioxide by equation (3) produces $H^+$ and $Cl^-$ ions in a mole ratio of 2 to 1. It will be seen from the above equations that the mole ratio feed requirement of $H^+$:$Cl^-$ to the reaction medium is always less than 2 to 1 whenever the efficiency ($E$) is less than 1, which is the usual circumstance. It also follows that the lower the efficiency, the lower is the $H^+$:$Cl^-$ mole ratio required.

Thus, the direct feed of the products of the reaction of sulphur dioxide and chlorine by reaction (3) to the reaction medium as the sole source of hydrogen ions, chloride ions and sulphate ions introduces imbalances to the system and upsets its steady state operation. Thus, either the quantity of hydrogen ion is too high while the chloride ion quantity is correct or quantity of chlorine ion is too low while the quantity of hydrogen ion is correct. Either condition is unsatisfactory. In the first instances, the acidity of the reaction medium will increase leading to an increased rate of reaction which in turn leads to a more rapidly increasing acidity which itself leads to an even faster reaction rate. The reaction thus will tend to get out of control and possibly lead to explosion. The acidity of the reaction medium also will achieve a value at which acid sulphate is deposited. While the acid sulphate deposition removes acid from the reaction medium and hence would help to control the acid level, nevertheless the use of sodium acid sulphate in a pulp mill is not desirable because of the loss of acid with the salt.

In the second instance, while the decreased chloride to chlorate mole ratio initially leads to an increased efficiency, the necessity to keep the acid feed level correct leads to decreasing feeds of chloride ion which in turn leads to a slowing down and eventual stopping of the chlorine dioxide-producing reaction.

Additionally, if all the chlorine which is produced by the reaction of equations (1) and (2) along with the chlorine dioxide is recovered and reaction of that recovered chlorine with sulphur dioxide in equation (3) proceeds to completion, then the quantity of hydrogen ion available from that reaction per mole of chlorine dioxide produced is as follows:

$H^+$ available = $(12-10E/E)$ moles — per mole of $ClO_2$ and similarly the chloride ion availability is as follows:

$Cl^-$ available = $(6-5E/E)$ moles — per mole of $ClO_2$. Thus, the availability of hydrogen ions and chloride ions provided by the reaction of the recovered chlorine with sulphur dioxide exceed both the hydrogen ion and chloride ion requirements for the production of chlorine dioxide, except in the remote case when the efficiency of conversion of chlorate to chlorine dioxide is 100%.

However, some of the chlorine produced by equations (1) and (2) usually is dissolved in the chlorine dioxide solution and therefore is not normally recoverable. This usually amounts to 20 to 40% of the chlorine present in the gaseous reactants stream removed from the chlorine dioxide generator.

The loss of chlorine in the chlorine dioxide solution thus considerably decreases the chlorine available from the chlorine dioxide-producing reaction to react with sulphur dioxide and this may result in an insufficient quantity of recovered chlorine, necessitating a feed of external chlorine, as discussed in more detail below.

Sodium sulphate is the sole salt precipitated from the reaction medium. Where sodium chlorate provides the sole source of sodium ions to the reaction medium, then $(1/2E)$ moles of sulphuric acid and hence sulphate ions are required to form sodium sulphate with the sodium ions of the sodium chlorate.

This latter condition is the one that pertains when the reaction products of sulphur dioxide and chlorine are intended to provide all the sulphate ion requirement of the reaction medium. The quantity of sodium sulphate produced per mole of chlorine dioxide formed may, however, be increased by introducing additional sodium ions in the form of sodium chloride and sulphate ions in the form of sulphuric acid.

When sodium chloride and sulphuric acid are added in this way, the proportion of the chloride and hydrogen ion requirements supplied from the reaction products of sulphur dioxide and chlorine diminish.

Therefore, the minimum quantity of sodium sulphate produced and the maximum amount of sulphuric acid required to be produced by reaction of sulphur dioxide and chlorine result when sodium chlorate is the sole source of sodium ions for chlorine dioxide generator and hence when $(1/2E)$ moles of sulphuric acid are produced and fed to the chlorine dioxide generator. The invention is discussed primarily with respect to this condition, but it will be understood from this discussion that the quantity of sodium sulphate produced by the chlorine dioxide generator may be varied independently of the quantity of chlorine dioxide produced.

Another important consideration, therefore, is that the quantity of chlorine reacted with sulphur dioxide must be restricted to the quantity which produces no more than just sufficient sulphate ion to combine with the sodium ions introduced to the reaction medium with the sodium chlorate.

In addition to the many constraints on the parameters of the chlorine dioxide producing reaction, therefore, there are constraints on the sulphur dioxide and chlorine reaction to provide hydrochloric acid and sulphuric acid which must be observed if a steady state chlorine dioxide-generating process is to result.

These constraints are:
(i) produce no more than just sufficient sulphate ion to compensate for the quantity of sodium ions introduced to the reaction medium;
(ii) react less than all the chlorine produced in the chlorine dioxide-producing reaction with sulphur dioxide to compensate for any excess quantities of hydrogen ion and chloride ion otherwise provided;
(iii) compensate for losses of produced chlorine in the chlorine dioxide solution to provide the required quantities of acid and chloride; and
(iv) compensate for the incorrect mole ratio of hydrogen ion to chloride ion to provide that required in the feed to the chlorine dioxide-producing reaction medium at its prevailing efficiency.

Thus, in order to provide a chlorine dioxide generating system in which chlorine produced in the generation reaction is reacted with sulphur dioxide and the products of the reaction are fed to the generator and in which steady state conditions are maintained throughout there are a large number of parameters which have to be balanced at the prevailing efficiency of the chlorine dioxide-producing reaction.

Because of the numerous constraints on the system as discussed fully above, the options open for achieving the suitable adjustment of the feeds are strictly limited. If the options discussed in more detail below are not adopted, then the system is imbalanced and non-steady state operations result with consequently non-beneficial results.

In accordance with a preferred embodiment of the invention, the reaction of sulphur dioxide with chlorine produced by the chlorine dioxide generation reaction is used to produce no more than just sufficient sulphate ions equivalent to the quantity of sodium ions introduced with the sodium chlorate to produce neutral sodium sulphate. As mentioned above, the quantity of sodium ion introduced with sodium chlorate is $1/E$ moles/mole of chlorine dioxide and hence the maximum quantity of sulphate ions required is $1/2E$ moles/mole of chlorine dioxide.

It follows from equation (3) above that if just $1/2E$ moles of sulphate ion are to be formed, then the following molar quantities of hydrogen ion and chloride ion only are formed by the reaction:

$H^+ = (2/E)$ moles/mole $ClO_2$ $Cl^- = (1/E)$ moles/mole $ClO_2$

From the recitation of hydrogen ion and chloride ion requirements above, it will be seen that the following additional quantities of hydrogen ion and chloride ion need to be provided to supplement those provided by the reaction of sulphur dioxide with chlorine if the feed requirements of these species to the chlorine dioxide-generating reaction medium are to be met, $$H^+ \text{ required} = \frac{6-4E}{E} - \frac{2}{E} = \frac{\frac{4-4E}{E} \text{ moles}}{\text{mole } ClO_2}$$

$$Cl^- \text{ required} = \frac{5-4}{E} - \frac{1}{E} = \frac{\frac{4-4E}{E} \text{ moles}}{\text{mole } ClO_2}$$

The supplemental requirements of hydrogen ion and chloride ions, therefore, are the same, and, in accordance with one of the options provided in this invention, are provided by hydrogen chloride or hydrochloric acid, which provides 1 mole of hydrogen ion for each mole of chloride ion.

In a preferred aspect of this option, the hydrogen chloride or hydrochloric acid used in the supplementation of the feed is formed by reaction of a further portion of the chlorine formed in the chlorine dioxide generator with hydrogen to provide the required quantity of hydrogen chloride.

The total quantity of chlorine reacted in accordance with this preferred aspect of the invention in the reactions with sulphur dioxide and hydrogen thus is:

$$\frac{1}{2E} + \frac{4-4E}{2E} = \frac{\frac{5-4E}{2E} \text{ moles}}{\text{mole } ClO_2}$$

However, the quantity of chlorine formed in the chlorine dioxide-producing reaction is $(6-5E/2E)$ moles/mole $ClO_2$ and hence the quantity of chlorine produced always exceeds the chlorine requirement by a quantity of $1-E/2E$ moles/mole $ClO_2$, except in the unlikely condition of 100% efficiency.

As mentioned above, however, usually between about 20 and 40% of the chlorine produced is dissolved in the chlorine dioxide solution during the recovery of chlorine dioxide and hence is not available for reaction with sulphur dioxide or hydrogen. Where this quantity exceeds $1-E/2E$ moles/mole $ClO_2$, therefore, an external feed of chlorine is required to compensate for such loss. Since substantially complete separation of chlorine dioxide and chlorine usually is not achieved, an external source of chlorine normally is required in this preferred aspect of the invention.

The hydrogen chloride or hydrochloric acid may be mixed with the products of the reaction of sulphur dioxide and chlorine prior to feed to the chlorine dioxide-producing reaction medium or the various materials may be separately fed to the reaction medium.

The second option which may be used to provide the required adjustment is to use sodium chloride, as a solid or as an aqueous solution thereof, to provide the supplemental chloride ion requirement. Since 1 mole of sodium ions is introduced to the reaction medium for each mole of chloride ion, equivalent adjustment of the sulphate ion feed is required to provide sufficient sulphate ions to form sodium sulphate from the sodium ions introduced with the sodium chloride. There is also required suitable adjustment of the hydrogen ion feed and, in this option, both the hydrogen ion adjustment and the additional sulphate ion requirement are provided by external sulphuric acid.

Since 1/2 mole of sulphate ion is required for each mole of sodium ion added and 1 mole of chloride ion supplement is required for each mole of hydrogen ion supplement, it follows that, in this second option, the external sodium chloride and sulphuric acid feeds are used in a molar ratio of 2:1.

The external feeds each may be added to the products of reaction of sulphur dioxide and chlorine prior to feed thereof to the chlorine dioxide-producing reaction medium. Alternatively, one only of the external feeds may be added to the products of reaction of sulphur dioxide and chlorine prior to feed thereof to the chlorine dioxide-producing reaction medium, while the other of the external feeds is fed directly to the reaction medium. Further, each of the feeds to the reaction medium may be fed separately thereto.

As a third option, part of the required hydrogen and chloride ion may be provided by hydrogen chloride or hydrochloric acid, and part by a mixture of sodium chloride and sulphuric acid.

These three options are the only ones available if a steady state reaction is to be maintained. Attempts to use other superficially-obvious alternatives leads to imbalance.

For example, in the second option above, if it were attempted to produce the additional sulphate ion requirement by the reaction of sulphur dioxide and chlorine, failure would result since the reaction also produces chloride ions, thereby requiring a suitable decrease in the quantity of supplemental sodium chloride, which in turn would lead to a decrease in the quantity of sodium ions, so that the quantity of sulphate ions then would exceed the required quantity.

Therefore, it is essential in the present invention, to react no more than just sufficient chlorine with sulphur dioxide to produce sulphate ions in a quantity to form neutral sodium sulphate ($Na_2SO_4$) from the sodium ion fed to the chlorine dioxide-producing reaction medium with sodium chlorate, and to provide supplementary equimolar quantities of hydrogen and chloride ions to the products of the sulphur dioxide and chlorine reaction to give the total feed requirements of these ions, such supplementary equimolar quantities being provided either by hydrogen chloride or by a mixture of 2 molar proportions of sodium chloride to each molar proportion of sulphuric acid.

As mentioned previously, the reaction of sulphur dioxide and chlorine is an exothermic one and, in accordance with a further aspect of the present invention, the heat generated in the exothermic reaction is utilized to provide at least part of the heat required to maintain the chlorine dioxide-producing reaction medium at its boiling temperature. This may be achieved by providing the reactor in which the sulphur dioxide and chlorine react in heat exchange relationship with the reaction medium.

Where the exothermic reaction of chlorine and sulphur dioxide is insufficient to provide all the heat requirement of the chlorine dioxide-producing reaction medium, additional quantities of the total heat requirement may be provided, for example, from the heat value of steam from an ejector used to maintain the generator under a subatmospheric pressure where such an operation is used, from the heat of dilution of the acid produced by the reaction of the sulphur dioxide and chlorine when such acid is added to the reaction medium, and from the heat of reaction of hydrogen and chlorine where such reaction occurs.

DESCRIPTION OF PREFERRED EMBODIMENTS

Figure 1:
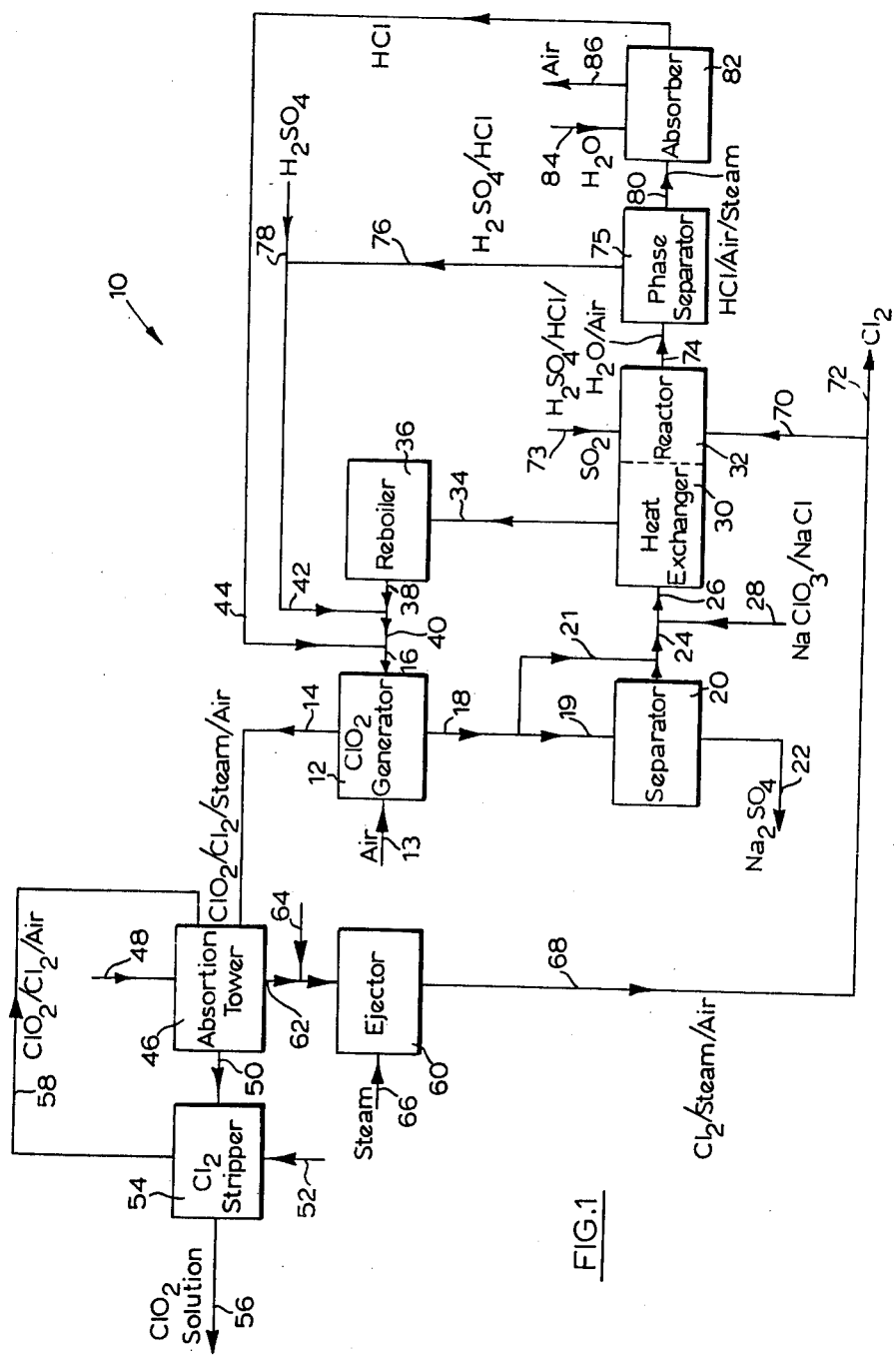
FIG. 1 is a schamatic flow sheet of one embodiment of the invention.

Referring first to FIG. 1, there is illustrated a chlorine dioxide producing system 10 including a generator 12. In the generator 12, there is present a chlorine dioxide-producing reaction medium containing sodium, chloride, chlorate, sulphate and hydrogen ionic species. The reaction medium is maintained at its boiling point while the vessel is maintained under a vacuum. The temperature and vacuum may vary widely, typically from 25° to 90° C at a pressure of 20 to 400 mm mercury absolute. Air is bled into the generator by line 13 to provide the absolute pressure in the generator.

The boiling temperature of the reaction medium causes water to be evaporated therefrom which dilutes the chlorine dioxide and chlorine formed from the reaction medium. The resultant gaseous mixture is removed from the reaction zone by line 14. When after initial start-up the reaction medium becomes saturated with sodium sulphate, anhydrous neutral sodium sulphate precipitates from the reaction medium.

The generator 12 is run in a substantially continuous manner with the spent chemicals of the reaction medium being replenished continuously, in this embodiment, by an aqueous feed solution in line 16 containing sodium chlorate, sodium chloride, hydrochloric acid and sulphuric acid, and the liquid input being balanced by liquid and steam output so that the liquid level in the generator 12 remains substantially constant.

The precipitated sodium sulphate is removed, continuously or intermittently, from the generator 12, as a slurry with some spent reaction medium by line 18. The removed slurry is partly passed by line 19 to a separator 20 wherein the crystalline sodium sulphate is separated from the mother liquor and is recovered therefrom by line 22 as one of the products of the system 10 for use in pulp mill operations. The remainder of the slurry in line 19 is recycled to the generator 12 in a recirculation loop, described in more detail below.

The mother liquor from the separation of the solid phase in the separator 20 is combined with the remainder of the slurry in line 21 and is passed by lines 24 and 26, after the addition of an aqueous solution of sodium chlorate and sodium chloride by line 28 containing sufficient quantities of these materials to make up the quantities consumed in the generator 12, to a heat exchanger 30 in the recirculation loop and associated with a reactor 32.

The heat exchanger 30 and the reactor 32 may be constituted by the shell side and tube side respectively of a conventional heat exchange apparatus, or any other convenient apparatus.

From the heat exchanger 30, the heated solution passes by line 34 to a reboiler 36 wherein any additional heat required to increase the temperature of the aqueous solution in line 34 to that required in the generator 12 may be provided. The reboiler may be omitted in cases where sufficient heat is available from other sources to provide a recirculating feed liquor of required temperature.

The solution then passes by lines 38, 40 and 16, which complete the recirculation loop, to the generator 12, after addition of a mixture of hydrochloric and sulphuric acids by line 42 and hydrochloric acid by line 44. The heat of dilution of the acids in lines 42 and 44 also increases the heat content of the feed solution in line 16.

The gaseous mixture of chlorine dioxide, chlorine and steam in line 14 is passed, after partial condensation of the steam, if desired, to a chlorine dioxide absorption tower 46 to which water is fed by line 48 to condense the remaining steam and to form an aqueous solution of chlorine dioxide which is removed from the absorption tower 46 by line 50.

Usually a certain quantity of the chlorine present in the gaseous mixture in line 14 is dissolved in the chlorine dioxide solution during the absorption procedure. The concentration of dissolved chlorine present in the chlorine dioxide solution may be decreased by air stripping chlorine from the aqueous solution of chlorine dioxide in line 50 by air fed by line 52 to a chlorine stripper 54. The chlorine stripper may be omitted if the concentration of chlorine in the aqueous solution in line 50 may be tolerated in the end use of the chlorine dioxide solution.

The aqueous solution of chlorine dioxide resulting from the stripping operation is recovered by line 56 as the other product of the system 10. The mixture of air and chlorine also resulting from the stripping, together with any chlorine dioxide stripped from the aqueous solution line 50, is forwarded by line 58 to the absorption tower 46.

The gaseous mixture of chlorine and air resulting from the separation of the chlorine dioxide in the absorption tower 46 is passed to an ejector 60 by line 62, with an air bleed thereto, if desired, by line 64. Steam is fed to the ejector 60 by line 66 to maintain the generator 12 under the desired vacuum and to form with the chlorine in line 62 a gaseous mixture in line 68 of chlorine, steam and air. Any other convenient vacuum-inducing means may be used to maintain the vacuum in the generator 12.

A portion of the gaseous mixture of chlorine, steam and air passes by line 70 to the reactor 32 in the quantity desired to react with sulphur dioxide to provide the sulphate ion requirement of the generator 12. The remainder of the gaseous mixture may be vented by line 72 for absorption in water or sodium hydroxide solution.

Sulphur dioxide also is fed to the reactor 32 by line 73 and reacts with the chlorine and the steam to provide a mixture of sulphuric acid, hydrochloric acid, air and steam. The reaction between the sulphur dioxide and chlorine is exothermic and the heat generated heats the solution passing through the heat exchanger 30 to provide at least part of the heat requirement of the generator 12. The water fed to the reactor 32 in the form of steam generally is insufficient to absorb all the hydrogen chloride and hence a mixture of gaseous and liquid products result.

The gaseous and liquid phase mixture formed in the reactor 32 is passed by line 74 to a phase separator 75 wherein the liquid phase of sulphuric acid and hydrochloric acid is separated and passed by lines 76 and 42 to the hot aqueous recirculating generator feed liquor in line 38.

Additional quantities of sulphuric acid are added to the acid solution in line 76 by line 78 in the molar ratio of 1:2 with respect to the sodium chloride fed by line 28, the quantities of sodium chloride and sulphuric acid in this way being just sufficient to provide the hydrogen ion and chloride ion requirements of the generator 12 not provided by the reaction in the reactor 32.

The gaseous phase from the phase separation, consisting of steam, hydrogen chloride and air, is passed from the phase separator 75 by line 80 to an absorber 82, to which cooling water is fed by line 84. The cooling of the gaseous phase causes condensation of the steam and the formation of hydrochloric acid by absorption of hydrogen chloride, allowing the air to be vented by line 86.

The hydrochloric acid formed by absorption of hydrogen chloride in the absorber 82 then is passed by line 44 to the hot aqueous solution in line 40.

Alternatively, the hydrochloric acid in line 44 may be mixed with the acid in line 76 or line 42 to provide a single acid feed line in the hot aqueous solution in line 38.

In a further alternative, the mixed acid stream in line 76 may be combined with the hydrochloric acid stream in line 44 to again provide a single acid feed stream to the hot recirculating generator feed liquor in line 40. The supplemental sulphuric acid fed in line 78 may be provided prior to or after combination with the hydrochloric acid feed line.

As an alternative to the use of a reactor 32 in heat exchange relationship with the recycle stream 26, the reaction between the sulphur dioxide fed by line 73 and the chlorine fed by line 70 may be carried out in a suitable device positioned in a generator feed line. The latter feed line is designed so that substantially complete reaction between the chlorine, sulphur dioxide and steam occurs prior to the injection of the reaction products directly into the generator. The feed line is positioned in heat exchange relationship with the generator liquor so that the heat of reaction is provided to the liquor.

Any other convenient manner of obtaining heat exchange between the chlorine dioxide-producing reaction medium and the reaction vessel wherein the sulphur dioxide reacts with chlorine may be utilized.

Figure 2:
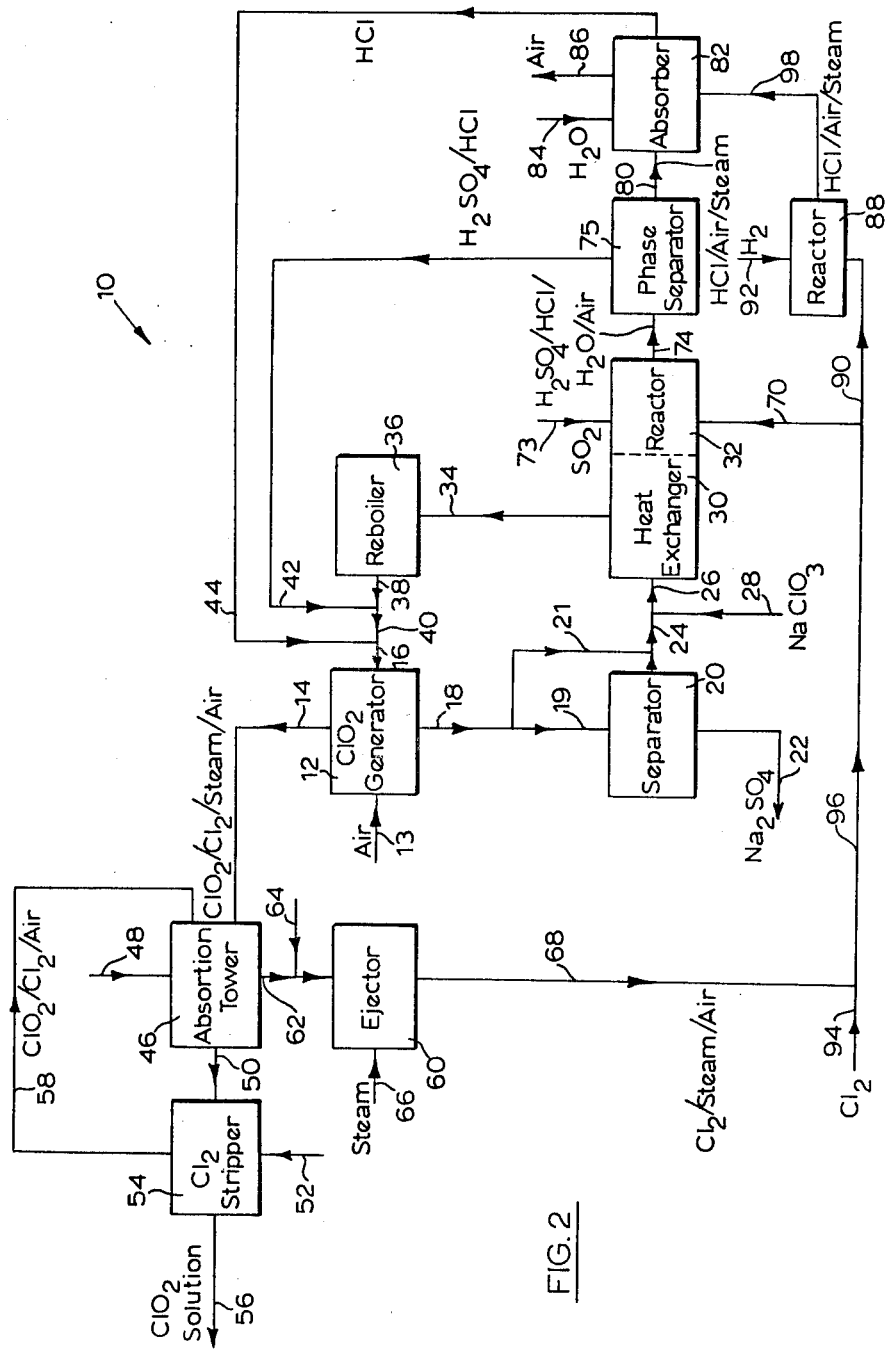
FIG. 2 is a schematic flow sheet of a second embodiment of the invention.

Turning now to the embodiment of FIG. 2, there is shown therein a similar operation to that illustrated in FIG. 1 with important modifications. Since many elements are common to the embodiments of FIGS. 1 and 2, the same reference numerals are used to denote such common elements.

As compared with FIG. 1, feed of sodium chloride in the solution in line 28 is omitted, the chlorine vent in line 72 is omitted and the supplementary sulphuric acid feed in line 78 is omitted. Included, however, is a second reactor 88 to which a gaseous mixture of chlorine, steam and air is fed by line 90 for reaction with hydrogen fed by line 92 to form hydrogen chloride.

The chlorine feed stream in line 90 is provided by part of the chlorine stream in line 68 supplemented as required by an external source of chlorine in line 94. The proportion of the mixed chlorine feed in line 96 passing to the reactor 32, as in the embodiment of FIG. 1, is just sufficient to form the sulphate ion required to form neutral sodium sulphate from the sodium ions fed to the generator 12 in the sodium chlorate while the proportion of chlorine fed by line 90 to the reactor is just sufficient to form hydrogen chloride in the quantity required to provide the supplementary hydrogen ion and chloride ion feeds for the generator 12.

The gaseous mixture of hydrogen chloride, air and steam resulting from the reactor 88 is passed by line 98 to the absorber 82 for absorption of the hydrogen chloride and steam and venting of the air along with the gas stream in line 80.

If desired, a combination of the embodiments of FIGS. 1 and 2 may be used, with part of the supplementary hydrogen ions and chloride ions being provided by sulphuric acid fed by line 78 and sodium chloride fed by line 28 while the remainder of the supplementary hydrogen ions and chloride ions is provided by hydrogen chloride in line 98.

SUMMARY

The present invention, therefore, provides a continuous chlorine dioxide generating system which is integrated with the reaction of sulphur dioxide and chlorine and which achieves continuously steady state conditions. Modifications are possible within the scope of the invention.

What is claimed is:

1. A method for the steady state continuous production of chlorine dioxide from an acid aqueous reaction medium by reduction of chlorate ions with chloride ions, which comprises:
   (a) establishing an aqueous acid reaction medium containing hydrogen ions, chlorate ions, chloride ions, sodium ions and sulphate ions in a reaction zone capable of forming chloride dioxide and chlorine and having a total acid normality of between about 2 and about 4.8 normal,
   (b) maintaining said reaction zone under a subatmospheric pressure, maintaining said reaction medium at its boiling point at an elevated temperature below that above which substantial decomposition of chlorine dioxide occurs,
   (c) continuously generating chloride dioxide and chlorine from said aqueous reaction medium in accordance with the equations:

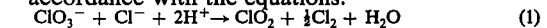
$$ClO_3^- + Cl^- + 2H^+ \rightarrow ClO_2 + \tfrac{1}{2}Cl_2 + H_2O \quad (1)$$

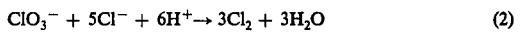
$$ClO_3^- + 5Cl^- + 6H^+ \rightarrow 3Cl_2 + 3H_2O \quad (2)$$

the proportion of chlorate ions converted to chlorine dioxide in accordance with equation (1) being designated the efficiency (E) of the chlorine dioxide and chlorine generating reaction, said efficiency being less than 1.00,
   (d) continuously feeding to said reaction medium hydrogen ions in a quantity of $(6-4E/E)$ moles per mole of chlorine dioxide formed and chloride ions in a quantity of $(5-4E/E)$ moles per mole of chlorine dioxide formed,
   (e) continuously feeding to said reaction medium sodium chlorate in a quantity of $(1/E)$ moles per mole of chlorine dioxide formed in sulphate ions in a quantity of $(1/2E)$ moles per mole of chlorine dioxide formed,
   (f) continuously evaporating water from said reaction medium to form in said reaction zone with said generated chlorine dioxide and chlorine in gaseous mixture of chlorine dioxide, chlorine and water vapour,
   (g) continuously depositing from said aqueous reaction medium $(1/2E)$ moles of anhydrous neutral sodium sulphate per mole of chlorine dioxide formed,
   (h) continuously removing said gaseous mixture from said reaction zone, continuously condensing the water vapour of said removed gaseous mixture, continuously forming an aqueous solution of substantially all the chlorine dioxide content of said gaseous mixture and additionally optionally containing a minor proportion of the chlorine content of said gaseous mixture,
   (i) continuously recovering said aqueous solution of chlorine dioxide,
   (j) reacting sulphur dioxide and water with chlorine including at least part of substantially all the remainder in said gaseous mixture not dissolved in said aqueous chlorine dioxide solution to form hydrochloric acid and sulphuric acid in just sufficient quantity to provide $(1/2E)$ moles of sulphate ion in said sulphuric acid,
   (k) continuously forwarding said hydrochloric acid and sulphuric acid formed in the latter reaction to said reaction medium to provide part only of both said fed hydrogen ions and chloride ions and all of said fed sulphate ions,
   (l) continuously supplementing the hydrogen ion and chloride ion quantities of said forwarded stream to provide said feed of hydrogen ions of $(6-4E/E)$ moles per mole of chlorine dioxide formed and said feed of chloride ions of $(5-4E/E)$ moles per mole of chlorine dioxide formed, and
   (m) removing said deposited anhydrous neutral sodium sulphate from said reaction zone.

2. The method of claim 1, wherein said continuous supplementing of the hydrogen ion and chloride ion quantities of said forwarded stream is achieved using $(4-4E/E)$ moles of hydrogen chloride per mole of chlorine dioxide formed.

3. The method of claim 2 wherein said hydrogen chloride is continuously formed by reaction of hydrogen and chlorine, said chlorine being constituted at least in part by the portion of the remainder of said chlorine in said gaseous mixture not dissolved in said aqueous chlorine dioxide solution.

4. The method of claim 3, wherein part of said chlorine in said gaseous mixture is dissolved in said chlorine dioxide solution, and all said remainder of said chlorine not dissolved in said chlorine dioxide solution together with any chlorine required from an external source is reacted with said sulphur dioxide and said hydrogen to produce from said reaction with sulphur dioxide said hydrochloric and sulphuric acid in just sufficient quantity to provide $(1/2E)$ moles of sulphate ion in said sulphuric acid and from said reaction with hydrogen said $(4-4E/E)$ moles of hydrogen chloride.

5. The method of claim 2, wherein the hydrogen chloride is in the form of hydrochloric acid.

6. The method of claim 1, wherein said continuous supplementing of the hydrogen ion and chloride ion quantities of said forwarded stream is achieved using sodium chloride and sulphuric acid in the molar ratio of 2:1 and in quantities continuously to provide $(4-4E/E)$ moles of both hydrogen ions and chloride ions per mole of chlorine dioxide formed.

7. The method of claim 1 wherein said continuous supplementing of the hydrogen ion and chloride ion quantities of said forwarded stream is achieved using hydrogen chloride, sodium chloride and sulphuric acid in quantities continuously to provide $(4-4E/E)$ moles of both hydrogen ions and chloride ions per mole of chlorine dioxide formed and 2 moles of sodium ions for each mole of sulphate ions.

8. The method of claim 1 including providing said reaction of chlorine and sulphur dioxide in heat exchange relationship with said reaction medium to provide continuously at least part of the heat required to maintain said reaction medium at said boiling temperature.

9. The method of claim 8 wherein said heat exchange relationship is achieved by establishing a second reaction zone in which said sulphur dioxide, chlorine and water react in exothermic manner to form said hydrochloric acid and said sulphuric acid, said second reaction zone being physically separate from said reaction zone, carrying out said removal of said deposited solid material from said reaction zone in a slurry with spent reaction medium, separating substantially completely said deposited solid material from a part only of said slurry, continuously incorporating said chlorate feed for said reaction medium in the remainder of said slurry, continuously passing the resulting combined aqueous solution into heat exchange relationship with said second reaction zone thereby to heat said resulting aqueous solution with the heat of reaction provided in said second reaction zone, continuously adding said forwarded stream of hydrochloric acid and sulphuric acid to said heated aqueous solution, continuously supplementing the hydrogen ion and chloride ion quantities of the resulting solution at a stage subsequent to said separation of solid material, and continuously cycling the feed solution resulting from said adding and supplementing to said reaction zone as said feed stream and to provide said continuous feed of chlorate ions to said reaction zone.

10. The method of claim 8 wherein said heat exchange relationship is achieved by establishing a second reaction zone in which said sulphur dioxide, chlorine and water react in exothermic manner to form said hydrochloric acid and said sulphuric acid, said second reaction zone being located within said first reaction zone in direct or indirect heat exchange relationship with said reaction medium.

11. A method for the steady state continuous production of chlorine dioxide from an acid aqueous reaction medium by reduction of chlorate ions with chloride ions, which comprises:
 (a) establishing an aqueous acid reaction medium containing hydrogen ions, chlorate ions, chloride ions, sodium ions and sulphate ions in a reaction zone capable of forming chlorine dioxide and chlorine and having a total acid normality of between about 2 and about 4.8 normal,
 (b) maintaining said reaction zone under a subatmospheric pressure, maintaining said reaction medium at its boiling point at an elevated temperature below that above which substantial decomposition of chlorine dioxide occurs,
 (c) continuously generating chlorine dioxide and chlorine from said reaction medium in accordance with the equations:

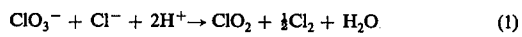

$$ClO_3^- + 5Cl^- + 6H^+ \rightarrow 3Cl_2 + 3H_2O$$

the proportion of chlorate ions connected to chlorine dioxide in accordance with equation (1) being designated the efficiency (E) of the chlorine dioxide and chlorine generating reaction, said efficiency being less than 1.00,
 (d) continuously feeding to said reaction medium hydrogen ions in a quantity of $(6-4E/E)$ moles per mole of chlorine dioxide formed and chloride ions in a quantity of $(5-4E/E)$ moles per mole of chlorine dioxide formed,
 (e) continuously feeding to said reaction medium sodium chlorate in a quantity of $(1/E)$ moles per mole of chlorine dioxide formed and sulphate ions in a quantity of at least $(1/2E)$ moles per mole of chlorine dioxide formed,
 (f) continuously evaporating water from said reaction medium to form in said reaction zone with said generated chlorine dioxide and chlorine a gaseous mixture of chlorine dioxide, chlorine and water vapor,
 (g) continuously depositing from said aqueous reaction medium at least $(1/2E)$ moles of anhydrous neutral sodium sulphate per mole of chlorine dioxide formed,
 (h) continuously removing said gaseous mixture from said reaction zone, continuously condensing the water vapour from said gaseous mixture, continuously forming an aqueous solution of substantially all the chlorine dioxide content of said gaseous mixture and additionally optionally containing a minor proportion of the chlorine content of said gaseous mixture,
 (i) continuously recovering said aqueous solution of chlorine dioxide;
 (j) reacting sulphur dioxide and water with chlorine including at least part of substantially all the remainder in said gaseous mixture not dissolved in said aqueous chlorine dioxide solution to form hydrochloric acid and sulphuric acid in no more than just sufficient quantity to provide $(1/2E)$ moles of sulphate ion in said sulphuric acid per mole of chlorine dioxide formed,
 (k) continuously forwarding said hydrochloric acid and sulphuric acid formed in the latter reaction to said reaction medium to provide part only of both said fed hydrogen ions and chloride ions

(l) continuously supplementing the hydrogen ion and chloride ion quantities of said forwarded stream to provide said feed of hydrogen ions of $(6-4E/E)$ moles per mole of chlorine dioxide formed, and said feed of chloride ions of $(5-4E/E)$ moles per mole of chlorine dioxide formed, and
 (m) removing said deposited anhydrous neutral sodium sulphate from said reaction zone.

* * * * *